United States Patent
Gultekin et al.

(10) Patent No.: US 6,215,793 B1
(45) Date of Patent: Apr. 10, 2001

(54) INITIALIZATION PROTOCOL FOR ADAPTIVE DATA RATES, AND RELATED TRANSCEIVER

(75) Inventors: Neil Gultekin, Antwerp; Frank Octaaf Van der Putten, Hombeek; Paul Marie Pierre Spruyt, Heverlee, all of (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 08/967,155

(22) Filed: Nov. 10, 1997

Related U.S. Application Data

(60) Provisional application No. 60/052,127, filed on Jul. 10, 1997.

(30) Foreign Application Priority Data

Nov. 12, 1996 (EP) ................................................ 064024137

(51) Int. Cl.[7] ...................................................... H04J 3/16
(52) U.S. Cl. ........................... 370/465; 370/464; 375/225
(58) Field of Search ..................................... 370/545, 465, 370/468, 522, 464; 375/219, 222, 225

(56) References Cited

U.S. PATENT DOCUMENTS

| | | | |
|---|---|---|---|
| 4,771,335 | * 9/1988 | Obara | 358/258 |
| 5,023,869 | 6/1991 | Grover et al. | |
| 5,297,186 | 3/1994 | Dong | |
| 5,353,280 | * 10/1994 | Ungerbock | 370/32.1 |
| 5,999,563 | * 12/1999 | Polley et al. | 375/222 |

FOREIGN PATENT DOCUMENTS

| | | |
|---|---|---|
| 0375032 | 6/1990 | (EP) . |
| 0601260 | 6/1994 | (EP) . |
| 0637150 | 2/1995 | (EP) . |

OTHER PUBLICATIONS

ANSI (American National Standards Institute, Inc.) T1E1.413—Std on ADSL, "Network and Customer Installation Interfaces, ASDL Metallic Interface", pub. Apr. '94, p. 83–104.

"Channel Analysis" and "Exchange" from the Standard Specification, p. 83.

* cited by examiner

*Primary Examiner*—Mark Zimmerman
*Assistant Examiner*—Enrique L Santiago
(74) *Attorney, Agent, or Firm*—Ware, Fressola, Van Der Sluys & Adolphson LLP

(57) ABSTRACT

To negotiate a data rate for future transmission over a communication link (TL), a first transceiver (TRX1) proposes a limited number of data rate values to a second transceiver (TRX2). During the selection phase wherein the first transceiver (TRX1) and the second transceiver (TRX2) at the other end of the communication link (TL) have to select one of the data rate values, one of the transceivers (TRX1, TRX2) may decide that none of the proposed data rate values is likely to be used for future transmission. This transceiver then announces a new proposal whereupon a new set of adapted data rate values is produced by one of the transceivers and proposed to the other.

12 Claims, 2 Drawing Sheets

INITIALIZATION PROTOCOL FOR ADAPTIVE DATA RATES, AND RELATED TRANSCEIVER

This application claims the benefit of U.S. provisional application No. 60/052,127 filed Jul. 10, 1997.

TECHNICAL FIELD

The present invention relates to an initialisation protocol to be executed by a first transceiver and a second transceiver to negotiate a data rate for future data transmission over a communication link which is coupled between the first transceiver and the second transceiver. It is also directed to a transceiver adapted to perform this initialisation protocol.

BACKGROUND OF THE INVENTION

Such an initialisation protocol is already known in the art, e.g. from the communication between two Asymmetric Digital Subscriber Line (ADSL) modems operating in accordance with the specifications of the ANSI (American National Standards Institute, Inc.) Standard on ADSL, the approved version of which has the reference T1E1.413 and title "*Network and Customer Installation Interfaces, Asymmetric Digital Subscriber Line (ADSL) Metallic Interface*". In the draft version of this standard published in April 1994, the initialisation protocol to be executed by an ADSL transceiver pair interconnected via a communication link, e.g. a twisted pair copper telephone line, is described in chapter 12, from page 83 to page 104. In view of the present invention, only a part of this initialisation protocol is relevant. More particularly, the part wherein the two communicating ADSL transceivers negotiate the future upstream and downstream data rates is to be considered. In FIG. 29 on page 83 of the above cited draft Standard Specification, this part is indicated by "Channel Analysis" and "Exchange"; The "Channel Analysis" procedure contains a first phase wherein the first ADSL transceiver, named the central office modem, transmits four optional upstream and downstream data rate values to the second ADSL transceiver, named the remote terminal modem. The second ADSL transceiver replies upon receipt of the just mentioned proposal by transmitting four optional upstream data rate values to the central office modem. These optional data rate values sent from transceiver 1 to transceiver 2 and vice versa, from transmitter 2 to transmitter 1, are encapsulated in the so called C-RATES1 and R-RATES1 messages described in paragraph 12.6.2 on pages 92–93 and 12.7.4 on page 96 of the above mentioned draft Standard Specification respectively. The "Exchange" procedure in addition contains a third phase wherein the central office modem and remote terminal modem communicate to each other which one of the optional data rates they prefer to use. In a fourth phase which also forms part of the "Exchange" procedure of the ADSL initialisation protocol, the remote terminal modem transmits a so called R-B&G message to the central office modem. This message contains the bits and gains information for the carriers which will carry the discrete multi tone (DMT) symbols that will constitute the future communication between the ADSL transceivers. This bits and gains information can be seen as a confirmation of the selected data rate in the previous phase, since the downstream and upstream data rates for future transmission are completely determined thereby. A disadvantage of the above known initialisation protocol is that the final selected and confirmed upstream and downstream data rates can not differ from the four data rate values proposed in the first phase. These proposed data rate values are chosen rather arbitrarily and may all differ significantly from the optimal upstream and downstream data rates which depend on the communication link characteristics. In other words, the known initialisation protocol does not support adaptive data rates, i.e. data rates which are adapted to the capacity of the communication link between the two transceivers. The only way to adapt data rates is to restart the complete identification and initialisation process.

SUMMARY OF THE INVENTION

An object of the present invention is to provide an initialisation protocol of the above known type, but which overcomes the above described drawback, i.e. which supports adaptation of data rates without restarting, i.e. without executing all previous identification and initialisation steps again.

This object is realised by an initialisation protocol to be executed by a first transceiver and a second transceiver to negotiate a data rate for future data transmission over a communication link which is coupled between the first transceiver and the second transceiver, the initialisation protocol containing a first phase wherein at least the first transceiver proposes a limited amount of data rate values for the data rate; a third phase wherein it is communicated which one of the data rate values is selected for the data rate; and a fourth phase wherein it is confirmed that the selected one of the data rate values will become the data rate for future transmission, wherein before the fourth phase is executed, the first transceiver or the second transceiver announces a new data rate proposal, whereupon the first phase is re-executed.

This object is also achieved by a transceiver adapted to transmit data via a communication link to a second transceiver, the transceiver including a line interface whereto information is applied to be transmitted over the communication link, the line interface being provided with at least one input terminal whereto the information is applied and an output terminal coupled to the communication link; a proposal generating means adapted to generate a message including a limited amount of data rate values for a data rate for future transmission between the transceiver and the second transceiver and to apply the message to an input of the line interface; a selection generating means adapted to generate a message to indicate which one of the data rate values is selected and to apply the message to an input of the line interface; a confirmation generating means adapted to generate a message to confirm which one of the data rate values will become the data rate for future transmission, and to apply the message to an input of the line interface; a data generating means coupled to an input of the line interface and adapted to apply data thereto to be transmitted by the line interface at the data rate selected and confirmed; and an initialisation control means, outputs of which are coupled to inputs of the proposal generating means, the selection generating means and the configuration generating means; the initialisation control means being adapted to control which one of the means whereof outputs are coupled to inputs of the initialisation means is allowed to apply a message to an input of the line interface; wherein the transceiver further includes: a proposal announcement generating means adapted to generate a message to announce a new data rate proposal and to apply the message to an input of the line interface; and further in that the initialisation control means is provided with an additional output coupled to an input of the proposal announcement generating means.

In this way, by allowing the transceivers to announce a new data rate proposal, and by formulating adapted optional data rate values in an additional execution of the first phase, the final selected and confirmed data rate may be better adapted to the communication link capacity than was possible by accepting any of the previously proposed data rate values during the fist execution of the first phase. Obviously, one of the transceivers may announce once more a new data rate proposal if the adopted data rate values included in the second proposal still cannot approximate the optimal data rate satisfactory.

In a particular implementation of the present initialisation protocol, the data rates proposed in the re-execution of the first phase may be chosen optimally.

Indeed, when the initialisation protocol contains a second phase wherein the capacity of the communication link, i.e. the highest transmission rate of the link, is measured, the transceivers have a good criterion to decide to announce a new proposal and a good tool to select the adapted proposed data rate values. If none of the first proposed data rate values approximates the highest supportable data rate on its lower side, a transceiver may inform the other transceiver about his wish to formulate a new proposal. This new proposal may include the highest supportable data rate and some lower data rate values which are also acceptable for the transceiver which generates the new data rate proposal. In this way, one re-execution of the first, second and third phase may lead to a final selected data rate, properly adapted to the link capacity. This data rate is confirmed in the fourth phase.

It is however to be remarked that the re-negotiation does not necessarily require that all steps of the first, second and third phase be re-executed. In the ADSL system for instance, it is not necessary that the remote terminal modem replies to the proposal of the central office modem with a proposal for the upstream data rate. Also the second phase wherein the channel is analysed does not necessarily has to be re-executed. Evidently, it is also not required that the central office modem of an ADSL system re-formulates a set of four adapted data rate values. One newly proposed data rate value may be sufficient if it is well-chosen.

It is also to be noted, that an initialisation protocol including such a second phase wherein the link is analysed is already known from the ADSL initialisation protocol. Indeed, the "Channel Analysis" procedure thereof contains the transmission of a so called C-MEDLEY signal (see paragraph 12.6.6 on page 95) and R-MEDLEY signal (see paragraph 11.7.8 on page 98). These MEDLEY signals are wideband pseudo-random signals which allow the receiving transceiver to measure the signal noise ratio (SNR) and to determine therefrom the highest data rate that the link can support.

A remark is that the present invention does not require that the link be analysed before a transceiver announces a new proposal. If one of the transceivers for whatever reason is not satisfied with the proposed data rate values in the first proposal, it may announce a new proposal, even if the link capacity is not yet known to him.

An additional optional feature of the present invention, minimises the transmission of irrelevant information.

Indeed, if one of the transceivers announces a new data rate proposal and the newly proposed optional data rate values are communicated before the selection phase is start up, no information with respect to selected ones of the first proposed data rates which will never be confirmed, is transmitted.

Alternatively, the present invention may be introduced in known initialisation protocols with minor modifications, but with the drawback that some irrelevant information may be transmitted.

In the third phase of the known ADSL initialisation protocol for instance, the remote terminal modem transmits a so called R-RATES2 message (see paragraph 12.9.4 on page 103) to the central office modem to communicate the selected one of the four optional downstream data rates. Thereupon, the central office modem replies with a C-RATES2 message (see paragraph 12.8.5 on page 100) to communicate to the remote terminal modem the selected upstream and downstream data rates. As will be explained later in more detail, the ADSL initialisation protocol can be easily adapted so that the central office modem announces a new proposal via the C-RATES2 message. This however implies that the previously transmitted R-RATES2 message contained irrelevant information and needlessly occupied bandwidth.

An additional feature of the present invention is that it is applicable to both unidirectional and bidirectional data rates.

When an upstream data rate and downstream data rate have to be negotiated, different alternative implementations of the present invention can be thought off. Announcing a new proposal may require that new optional upstream and downstream data rate values are transmitted from the first to the second transceiver. A more advanced implementation may allow the transceivers to announce a new proposal for only the downstream or only the upstream direction, so that no superfluous work is done if a satisfactory data rate is negotiated already for one of the two directions.

A characteristic feature of the present invention is that it may be used to initialise communication between two ADSL transceivers.

As already indicated in one of the above paragraphs, the C-RATES2 message in the third phase, according to the ADSL Standard used to communicate the selected upstream and downstream values, may alternatively be used to indicate that none of the optional data rate values is selected, but that a new proposal of four new optional data rates will be formulated.

An additional feature of the ADSL implementation of the present invention allows it to realise the object of supporting adaptive bit rates with minor modifications to the ADSL Standard Specification.

Indeed, table 39 on page 100 of the already cited draft ANSI Standard on ADSL lists all bit patterns which may be contained by the C-RATES2 message together with the associated data rate values selected for the upstream and downstream direction. If this list is extended with one additional bit pattern which is sent by the central office modem to the remote terminal modem to announce a new proposal (i.e. a re-execution of phase 1), the object is realised.

An additional advantageous feature of the transceiver according to the present invention may allow it to indicate that it supports re-negotiation of a data rate without starting up again.

In this way, the transceiver has the capability to indicate to the second transceiver that it is able to announce a new data rate proposal, to produce and to deal with a new set of optional data rate values. If the two communicating transceivers transmit this indication to each other, re-negotiation of a data rate will be possible without re-starting. If one of the two transceivers does not transmit this indication, it is not able to support such a re-negotiation and it will not be possible to deal with a new set of optional data rate values without restarting the whole identification and initialisation process.

Moreover, a communicating unit which communicates with a transceiver which is able to announce a new data rate proposal and to formulate a new data rate proposal, may also indicate that it supports re-negotiation.

Indeed, when the communicating unit, i.e. a second transceiver or modem, is not able to deal with a new proposal of the first transceiver it is useless for the first transceiver to attempt to re-negotiate. An indication of the communicating unit that it is capable or not capable to re-negotiate data rates may allows the system to avoid entering a status wherein the communication between the transceiver and its communicating unit is broken and wherein the identification and initialisation has to be restarted completely.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
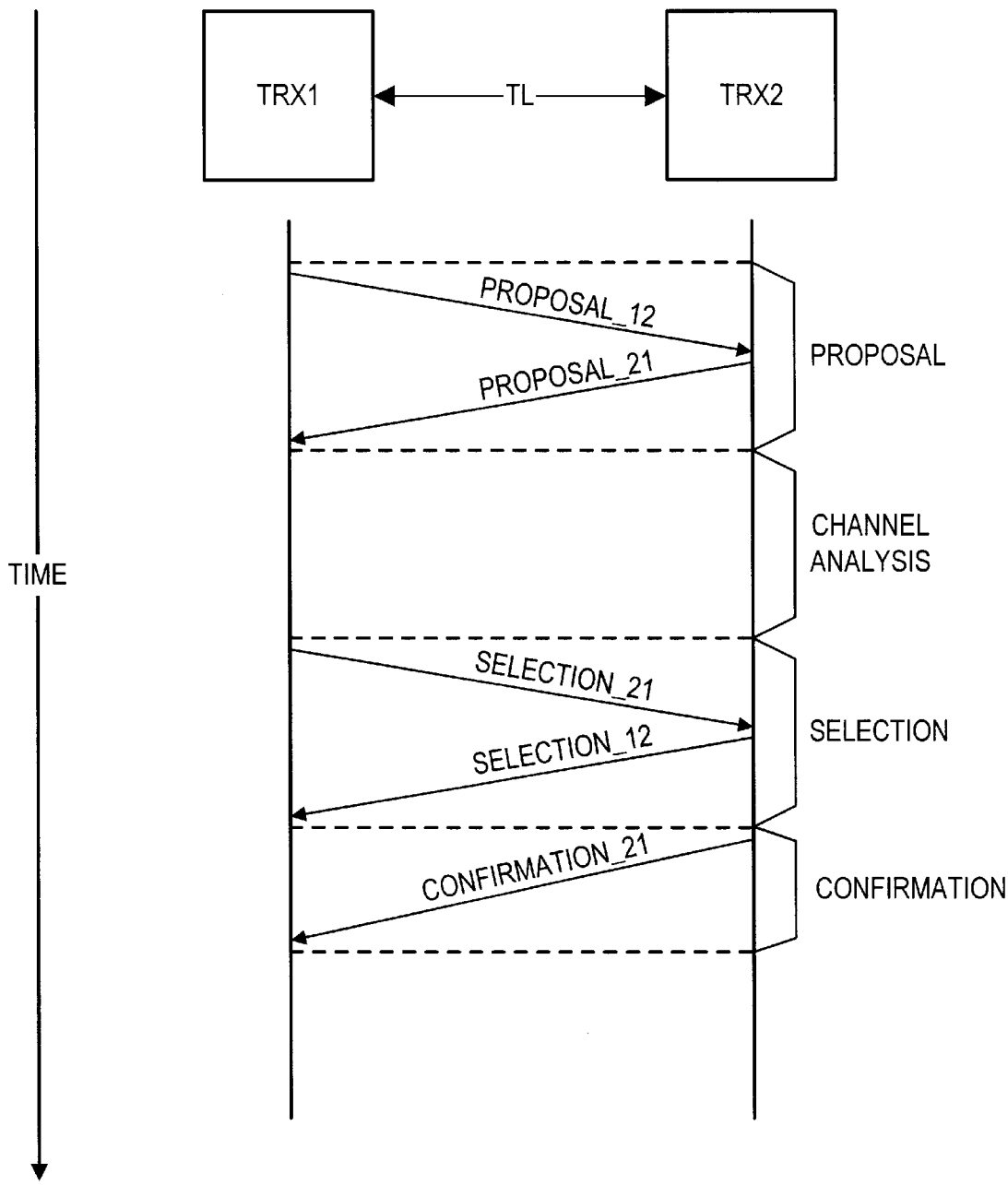
FIG. 1 represents a time diagram of the successive phases to be executed in an implementation of the initialisation protocol according to the present invention.

In FIG. 1, two ADSL modems, TRX1 and TRX2, are coupled via a telephone line TL. The first ADSL modem TRX1 is the so called central office modem whilst the second ADSL modem TRX2 is the remote terminal modem. The two modems TRX1 and TRX2 operate in accordance with the specifications of the ANSI Standard on ADSL to transmit data empacked in discrete multi tone (DMT) symbols in the downstream direction, from the central office modem TRX1 to the remote terminal modem TRX2, and in upstream direction, from the remote terminal modem TRX2 to the central office modem TRX1. These DMT symbols are carried by a set of 256 equidistant carriers. The bits constituting the DMT symbols are thereto spread over the different carriers. In the initialisation procedure, the two ADSL modems, TRX1 and TRX2, negotiate a downstream bit rate and an upstream bit rate, and decide, based on signal-noise-ratio measurements for each carrier, how many bits will be modulated on each particular carrier and at which power level each particular carrier will be transmitted. This is done in what is usually called the bit allocation procedure. At the end of this procedure, both ADSL modems, TRX1 and TRX2, know for instance that carrier 1 carries 2 bits, modulated thereon via 4 QAM modulation, and is transmitted with a 0.9 dB gain, carrier 2 carries 5 bits, modulated thereon via 32 QAM modulation, and is transmitted with a 1.2 dB gain, carrier 3 carries 4 bits, modulated thereon via 16 QAM modulation, and is transmitted with a 1.3 dB gain, and so on . . . . Obviously, the downstream and upstream data rates are determined when the bit constellation is given.

To negotiate the upstream and downstream data rates, and to obtain the bit constellation, the modems TRX1 and TRX2 produce and respond to a specific set of precisely time initialisation signals. The time line of these initialisation signals is represented in FIG. 1. To avoid overloading the figure, only the initialisation steps of the ADSL initialisation procedure which are relevant in view of the present invention are shown. The complete initialisation procedure is defined in chapter 12 of the earlier mentioned draft version of the ADSL Standard, published in April 1994, from page 83 to page 104. The next paragraphs will focus only on the "Channel Analysis" procedure and "Exchange" procedure described in paragraphs 12.6, 12.7, 12.8 and 12.9 from page 92 to 104. More concrete, it will be explained how these procedures can be adapted so that the ADSL modems support adaptive data rates.

The "Channel Analysis" procedure of the ADSL Standard contains the first phase, PROPOSAL, and second phase, CHANNEL ANALYSIS, of FIG. 1.

In the first phase, PROPOSAL, the central office modem TRX1 downstream transmits a message PROPOSE_12 which contains four optional data rate values for the downstream and upstream direction. The fields which describe one of the optional data rate values are defined in paragraph 12.6.2 of the draft ADSL Specification on page 92–93. It is noticed that the first message PROPOSE_12 is called the C-RATES1 message in this paragraph. The C-RATES1 message is accompanied by a C-MSG1 message, defined in paragraph 12.6.4 on page 93–94. This message is used for vendor identification and defining central office modem functionality but, since it is not relevant in view of the present invention, not further considered here. Upon the propose-12 message, the remote terminal modem TRX2 replies with a PROPOSE_21 message wherein four optional upstream data rate values are proposed to the central office modem TRX1. The fields which describe one of the optional upstream data rates are similar to those of the PROPOSE_12 message, and defined in paragraph 12.7.4 on page 96 of the draft ANSI Standard on ADSL. It is noticed that the message PROPOSE_21 is called the R-RATES1 message in this paragraph. Also this message is accompanied by a message R-MSG1 with vendor identification, etc. This accompanying message R-MSG1 is described in paragraph 12.7.6 on page 97 and not considered here.

In the second phase, CHANNEL ANALYSIS, the central office modem TRX1 transmits a wideband pseudo-random signal allowing the remote terminal modem TRX2 to estimate the signal-noise-ratio, to determine therefrom the maximum bit allocation for downstream carriers, the maximum downstream data rate and which one of the four optional downstream data rate values proposed by TRX1 in PROPOSE_12 is likely to be used. The wideband pseudo-random signal is called C-MEDLEY in the draft ADSL Standard and is defined in paragraph 12.6.6 on page 95. In the opposite direction, the remote terminal modem TRX2 also transmits a wideband pseudo-random signal, called R-MEDLEY in the referenced ADSL Standard, which allows the central office modem TRX1 to estimate the signal-noise-ratio for upstream carriers, to determine therefrom the maximum bit allocation for the upstream carriers, the maximum upstream data rate and which one of the four optional upstream data rate values proposed by TRX2 in PROPOSE_21 is likely to be used.

The "Exchange" procedure of the ADSL Standard contains the third phase, SELECTION, and fourth phase, CONFIRMATION, of FIG. 1.

In the third phase, SELECTION, the remote terminal modem TRX2 replies to the PROPOSE_12 message of TRX1 by transmitting to the central office modem TRX1 a message SELECTION_21 containing the selected optional data rate for downstream transmission and the highest data rate that can be supported for downstream transmission based on the signal-noise-ratio measurements for the downstream carriers in the CHANNEL ANALYSIS phase. It is noticed that this SELECTION_21 message is called the R-RATES2 message in the ADSL Standard and is defined in paragraph 12.9.4 on page 103. Table 41 on page 103 of this draft Standard lists the predetermined reserved bit patterns which have to be used by the remote terminal modem TRX2 to indicate in R-RATES2 which one of the four optional downstream data rates is selected. In the opposite direction, i.e. the downstream direction, the central office modem TRX1 replies to the PROPOSE_21 and SELECTION_21 messages by transmitting to the remote terminal TRX2 a message SELECTION_12 containing the selected optional data rates for downstream and upstream transmission. For upstream transmission, the selected optional data rate value is determined based on the signal-noise-ratio measurements for the upstream carriers in the CHANNEL ANALYSIS phase. For downstream transmission, a copy is made of the information in the SELECTION_21 message produced and transmitted by the remote terminal modem TRX2. It is noticed that the SELECTION_21 message is called the C-RATES2 message in the draft ADSL Standard and is defined in paragraph 12.8.5 on page 100. Table 39 on page 100 of this draft Standard lists the predetermined reserved bit patterns which have to be used by the central office modem TRX1 to indicate in C-RATES2 which one of the four optional downstream and four optional upstream data rate values is selected. According to the invention, this list is extended with one additional bit pattern which indicates that no selection is made for the up- and downstream data rates but a new proposal will be formulated by the central office modem TRX1. The C-RATES2 message is accompanied by a so called C-B&G message defined in paragraph 12.8.7 on page 101. This C-B&G message contains bits and gains information for the upstream carriers: for each upstream carrier, the C-B&G message indicates the number of bits to be modulated thereon by the remote terminal modem TRX2, and the gain or power level that should be used to transmit this carrier. When the C-RATES2 message contains the bit pattern which indicates that a new data rate proposal will be produced, the C-B&G message obviously contains superfluous information which is needlessly transported. The next step to be executed then is the first phase, PROPOSAL, wherein the central office modem TRX1 proposes new upstream and downstream data rate values to the remote terminal modem TRX2. Since the central office modem TRX1 has determined the highest data rate that can be supported for upstream transmission during the CHANNEL ANALYSIS phase and since the central office modem TRX1 is told the highest data rate that can be supported for downstream transmission by the remote terminal modem TRX2 in the SELECTION_21 message, the newly proposed optional upstream and downstream data rate values can be chosen very efficiently. It may thus be expected that the second execution of the PROPOSAL, CHANNEL ANALYSIS and SELECTION phase already results in a selected upstream and downstream data rate value which are well-adapted to the highest upstream and downstream data rates that can be supported on the telephone line TL. If however, the second selection of upstream and downstream data rate values does not yet satisfy the central office modem TRX1 at the time the SELECTION_12 message has to be sent, the central office modem TRX1 may again transmit the predetermined reserved bit pattern which indicates that a new proposal of upstream- and downstream data rates will be produced. The phases PROPOSAL, CHANNEL ANALYSIS and SELECTION are thus repetitively executed until a satisfactoring adapted upstream and downstream data rate value are found and communicated to the remote terminal modem TRX2 via the SELECTION_12 message. The associated bits and gains information for the upstream carriers which allows it to realise the selected upstream data rate value is communicated to the remote terminal modem TRX2 via the C-B&G message related to the selection-12 message.

In the fourth phase, CONFIRMATION, the remote terminal modem TRX2 transmits the bits and gains information with respect to the downstream channel to the central office modem TRX1: in the so called R-B&G message defined in paragraph 12.9.8 on page 104 of the draft ADSL Standard, the remote terminal indeed indicates for each downstream carrier the number of bits to be modulated thereon and the gain or power level to be applied when transmitting this downstream carrier. The initialisation protocol is terminated herewith.

Figure 2:
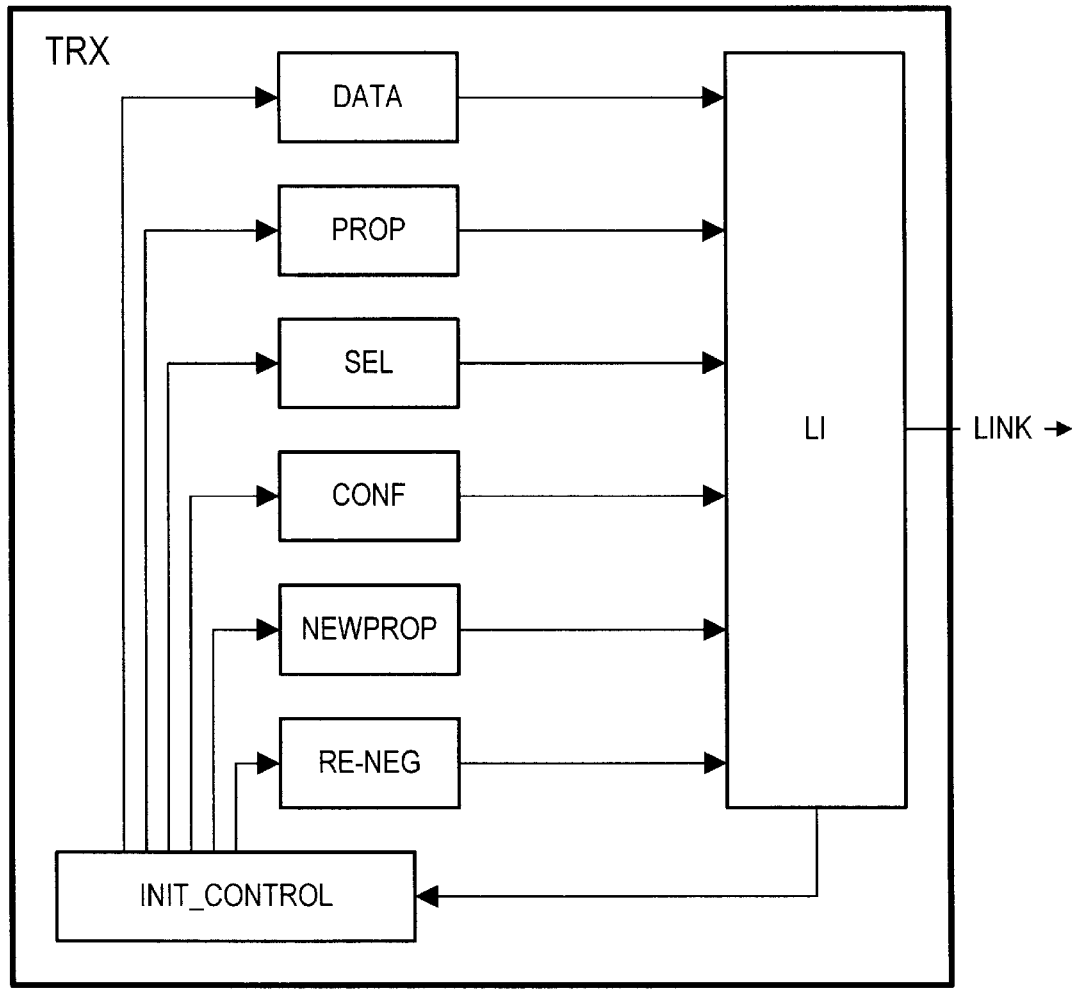
FIG. 2 represents a block scheme of a transceiver TRX adapted to perform the initialisation protocol according to the present invention.

The transceiver TRX of FIG. 2 includes a line interface LI, means which generate information, i.e. DATA, PROP, SEL, CONF, NEWPROP and RE-NEG, and a controller INIT_CONTROL.

The information generating means, DATA, PROP, SEL, CONF, NEWPROP and RE-NEG all have outputs coupled to an input of the line interface LI. It is to be remarked that it is not relevant with respect to the invention whether these outputs are coupled to one single input of the line interface LI or to several distinct inputs thereof. An output of the line interface LI is coupled to a communication link LINK and another output thereof is connected to an input of the controller INIT_CONTROL. The controller INIT_CONTROL has outputs coupled to control terminals of the information generating means PROP, SEL, CONF, NEWPROP and RE-NEG respectively.

Under control of the controller INIT_CONTROL, the information generating means which generates messages to be sent during initialisation, i.e. PROP, SEL, CONF, NEWPROP and RE-NEG apply a message to an input of the line interface LI. The line interface LI may be seen as a multiplexer or exclusive OR circuit which couples one of its inputs to the communication link LINK. Additional functions like modulation, demodulation, D/A and A/D conversion, data empacking or data depacking, . . . , may also be done by the line interface LI. The information generating means PROP, SEL, CONF, NEWPROP and RE-NEG may be realised by memory means which contain information to be transmitted in one of the initialisation messages, processing means which (for instance based on signal-noise-ratio measurements or information received from a communicating transceiver), determine new optional data rate values, or a selected optional data rate, and so on. In any event, these means do not contain unknown components so that a person skilled in the art, depending on the information that has to be generated, can design these information generating means. Referring to the just described implementation in the field of ADSL, one can suppose that the central office modem TRX1 in FIG. 1 is replaced by the transceiver TRX of FIG. 2. In that situation, the first generating means PROP produces the C-RATES1 message including the four optional upstream and downstream data rate values, SEL produces the C-RATES2 message in case no new proposal for negotiation is announced therein, CONF produces the C-B&G message which includes the bits and gains information, and NEWPROP produces the C-RATES2 message in case a new proposal for negotiation is announced therein. NEWPROP then generates a C-RATES2 message including for instance the reserved bit pattern 11111111, which is not yet used in table 39 on page 100 of the draft ADSL Standard. The information generating means RE-NEG generates the information to indicate to a communicating transceiver that it is capable of re-negotiating a data rate without restarting. This may be realised by producing in RE-NEG the value of the m15 bit of the C-MSG1 message which is described in paragraph 12.6.4 on pages 93–94. From table 36 on page 94, it can be seen that this m15 bit is reserved for future use. Hence, the RE-NEG information generating means of FIG. 2 may set this bit to 1 to indicate that the transceiver TRX supports the data rate re-negotiation. If not, the m15 bit is set to 0. To activate the different means which generate initialisation messages, PROP, SEL, CONF, NEWPROP and RE-NEG, the controller INIT_CONTROL uses information received from the communicating transceiver via the line interface LI, and information specified in the standard, e.g. certain time intervals that have to be respected between transmission of a message and transmission or receipt of a previous message. The functional block labelled DATA, produces the information that will be transmitted in the future at the data rate negotiated during initialisation. In case of an ADSL transceiver, DATA produces the bitstream which has to be encapsulated in discrete multi tone (DMT) symbols to be transmitted over the link LINK.

It is to be remarked that the ability to set the m15 bit is not only important or the transceiver TRX which launches the new proposal but even more important for the communicating transceiver. Indeed, if the communicating transceiver is able to tell the transceiver TRX via the m15 bit that it can support re-negotiating a data rate, the transceiver TRX knows that it makes sense to launch a new proposal. If the communicating transceiver does not support renegotiating data rates, it will not be able to react correctly to the new proposal of TRX as a result of which the communication between TRX and the communicating modem will be broken after a certain time interval. The complete identification and initialisation process will then be restarted.

It is remarked that although the above described implementation is realised in an ADSL environment, the present invention is not restricted thereto. For a person skilled in the art of telecommunications, it is apparently obvious that minor modifications to the above described implementation allow it to be applied in other systems wherein two transceivers negotiate a data rate for future transmission. HDSL (High Speed Digital Subscriber Line) systems, SDSL (Symmetric Digital Subscriber Line) systems, VDSL (Very High Speed Digital Subscriber Line) systems for instance may be adapted to support adaptive data rates by modifying the initialisation protocols thereof in accordance with the present invention.

Another remark is that the transmission medium which interconnects the two transceivers is of no importance for applicability of the present invention. Allowing one of the transceivers to launch a new proposal for a data rate if a previous proposal seems not to include a satisfactory data rate value, can be realised in initialisation protocols for transmission over a telephone line as described above, but also for transmission over a coaxial cable, an optical fibre link, a satellite link between a satellite and ground station, a radio link through the air, or whatever other transmission link. The term communication link, used in the introductory part and claims of this application thus should be interpreted as broadly as possible. Even hybrid telecommunication links, such as hybrid optical/cable links in an Hybrid Fibre Coax (HFC) network fall within the scope of this term.

Furthermore, it is noticed that, depending on the field wherein the invention is applied, the two transceivers may negotiate a bidirectional data rate (as described above in an ADSL system) or a unidirectional data rate (as in an HFC network for instance) wherein data are downstream broadcasted over a point-to-multipoint connection but wherein upstream transmission is done over a point-to-point channel whose data rate may be negotiated during initialisation.

Yet another remark is that the criterion to decide to announce a new proposal is no restrictive subject matter in view of the present invention. Indeed, if the channel is analysed as in the ADSL system by signal-noise-ratio measurements, the results thereof provide a good criterion to decide that the proposed data rate values are not satisfactory and a new proposal may be announced. Nevertheless other criteria, such as the capacity or data rate limitations of one of the transceivers, the service where future transmission will be used for, . . . , may indicate that the list of proposed data rate values does not contain well-adapted data rate values so that it is preferable to negotiate data rate values of a new list.

While the principles of the invention have been described above in connection with specific apparatus, it is to be clearly understood that this description is made only by way of example and not as a limitation on the scope of the invention.

What is claimed is:

1. An initialisation protocol method to be executed by a first transceiver (TRX1) and a second transceiver (TRX2) to negotiate a data rate for future data transmission over a communication link (TL) which is coupled between said first transceiver (TRX1) and said second transceiver (TRX2), said initialisation protocol method comprising the following steps:

a) at least said first transceiver (TRX1) transmitting a proposal message containing a first set of data rate values to said second transceiver (TRX2);

b) transmitting a selection message between said first transceiver (TRX1) and said second transceiver (TRX2) stating which one of said data rate values is selected; and c) transmitting a confirmation message between said first transceiver (TRX1) and said second transceiver (TRX2) that said selected one of said data rate values will become said data rate for future transmission, wherein before said confirmation message is transmitted, said first transceiver (TRX1) or said second transceiver (TRX2) announces a new data rate proposal by transmitting an announcement message between said first transceiver (TRX1) and said second transceiver (TRX2), whereupon at least said first transceiver (TRX1) transmits with a second set of data rate values different from said first set of data rate values until said selected one of said data rate values approximates satisfactorily an optimal or acceptable data rate for both said first transceiver (TRX1) and said second transceiver (TRX2).

2. An initialisation protocol method according to claim 1, characterised in that said initialisation protocol method further comprises the following step:

d. after transmitting the proposal message, measuring a highest data rate for transmission over said communication link (TL), and further wherein the transmitting of the announcement message for said new data rate proposal is based on said measuring step.

3. An initialisation protocol method according to claim 2, wherein said data rate is a bidirectional data rate, determined by an upstream data rate value and a downstream data rate value.

4. An initialisation protocol method according to claim 3, wherein said first transceiver (TRX1) and said second transceiver (TRX2) are modems of the Asymmetric Digital Subscriber Line (ADSL) type operating according to the ANSI Standard T1E1.413, and further in that:

in step a) the first transceiver (TRX1) transmits four upstream data rate values and four downstream data rate values whereupon said second transceiver (TRX2) proposes four upstream data rate values;

in step d) the first transceiver (TRX1) sends a message to said second transceiver (TRX2) for downstream signal-to-noise ratio measurement, and said second transceiver (TRX2) sends a message to said first transceiver (TRX1) for upstream signal-to-noise ratio measurement; and in step b) the second transceiver (TRX2) communicates to said first transceiver (TRX1) which one of said four downstream rate values is selected and the highest downstream rate value measured, and additionally said first transceiver (TRX1) communicates to said second transceiver (TRX2) either which one of said four upstream rate values and which one of said four downstream rate values is selected, or said announcement of a new data rate proposal.

5. An initialisation method protocol according to claim 4, wherein said announcement of a new data rate proposal is communicated to said second transceiver (TRX2) by transmitting a predetermined reserved bit pattern in the C-RATES2 message defined in said ANSI Standard T1E1.413.

6. An initialisation protocol method according to claim 2, wherein said first transceiver (TRX1) and said second transceiver (TRX2) are modems of the Asymmetric Digital Subscriber Line (ADSL) type operating according to the ANSI Standard T1E1.413, and;

in step a) the first transceiver (TRX1) proposes four upstream data rate values and four downstream data rate values whereupon said second transceiver (TRX2) proposes four upstream data rate values:

in step d) the first transceiver (TRX1) sends a message to said second transceiver (TRX2) for downstream signal-to-noise ratio measurement, and said second transceiver (TRX2) sends a message to said first transceiver (TRX1) for upstream signal-to-noise ratio measurement; and in step b) the second transceiver (TRX2) communicates to said first transceiver (TRX1) which one of said four downstream rate values is selected and a highest downstream rate value measured, and additionally said first transceiver (TRX1) communicates to said second transceiver (TRX2) either which one of said four upstream rate values and which one of ad four downstream rate values is selected, or said announcement of a new data rate proposal.

7. An initialisation protocol method according to claim 1, wherein announcing said new data rate proposal is performed before transmitting the selection message.

8. An initialisation protocol method according to claim 1, wherein announcing said new data rate proposal is performed during the transmitting of the selection message.

9. An initialisation protocol method according to claim 8, wherein said first transceiver (TRX1) and said second transceiver (TRX2) are modems of the Asymmetric Digital Subscriber Line (ADSL) type operating according to the ANSI Standard T1E1.413, and further in that:

in step a) the first transceiver (TRX1) proposes four upstream data rate values and four downstream data rate values whereupon said second transceiver (TRX2) proposes four upstream data rate values;

in step d) the first transceiver (TRX1) sends a message to said second transceiver (TRX2) for downstream signal-to-noise ratio measurement, and said second transceiver (TRX2) sends a message to said firs transceiver (TRX1) for upstream signal-to-noise ratio measurement; and in step b) the second transceiver (TRX2) communicates to said first transceiver (TRX1) which one of said four downstream rate values is selected and the highest downstream rate value measured, and additionally said first transceiver (TRX1) communicates to said second transceiver (TRX2) either which one of said four upstream rate values and which one of said four downstream rate values is selected, or said announcement of a new data rate proposal.

10. A transceiver (TRX) adapted to transmit data via a communication link (LINK) to a second transceiver, said transceiver (TRX) comprising:

a) a line interface (LI) whereto information is applied to be transmitted over said communication link (LINK), said line interface (LI) being provided with at least one input terminal whereto said information is applied and an output terminal coupled to said communication link (LINK);

b) a proposal generating means (PROP) adapted to generate a proposal message including a first set of data rate values for future transmission between said transceiver (TRX) and said second transceiver and to apply said proposal message to an input of said line interface (LI);

c) a selection generating means (SEL) adapted to generate a selection message to indicate which one of said data rate values is selected and to apply said selection message to an input of said line interface (LI);

d) a confirmation generating means (CONF) adapted to generate a confirmation message to confirm which one of said data rate values will become said data rate for future transmission, and to apply said confirmation message to an input of said line interface (LI);

e) a data generating means (DATA) coupled to an input of said line interface (LI) and adapted to apply data thereto to be transmitted by said line interface (LI) at said data rate selected and confirmed;

f) an initialisation control means (INIT_CONTROL), outputs of which are coupled to inputs of said proposal generating means (PROP), said selection generating means (SEL) and said confirmation generating means (CONF); said initialisation control means (INIT_CONTROL) being adapted to control which one of said means whereof outputs are coupled to inputs of said ms initialisation is allowed to apply a message to an input of said line interface (LI);

g) a proposal announcement generating means (NEW PROP) adapted to generate, until said selected one of said data rate values approximates satisfactorily an optimal or acceptable data rate for both said first transceiver (TRX1) and said second transceiver (TRX2), an announcement message to announce a new data rate proposal with a second set of data rate values different from said first set of data rate values and to apply said announcement message to an input of said line interface (LI); and h) said initialisation control means (INIT_CONTROL) is provided with an additional output coupled to an input of said proposal announcement generating means (NEW PROP).

11. A transceiver (TRX) according to claim 10, characterised in that said transceiver further includes:

i) re-negotiation indicating means (RE-NEG) adapted to generate a message to indicate that said transceiver (TRX) is equipped to support re-negotiation of said data rate, and to apply said message to an input of said line interface (LI).

12. A communication unit adapted to communicate with said transceiver (TRX) claimed in claim 10, characterised in that said communication unit includes:
re-negotiation indicating means adapted to generate a message to indicate to said transceiver (TRX) that said communication unit is capable of re-negotiating a data rate with said transceiver (TRX).

\* \* \* \* \*